Aug. 22, 1967    A. J. BUESCHER ET AL    3,336,874
DETENT METERING DEVICE
Original Filed Oct. 20, 1964    4 Sheets-Sheet 1

INVENTORS
ALFRED J. BUESCHER
MAX KRECIC
BY
ATTORNEYS

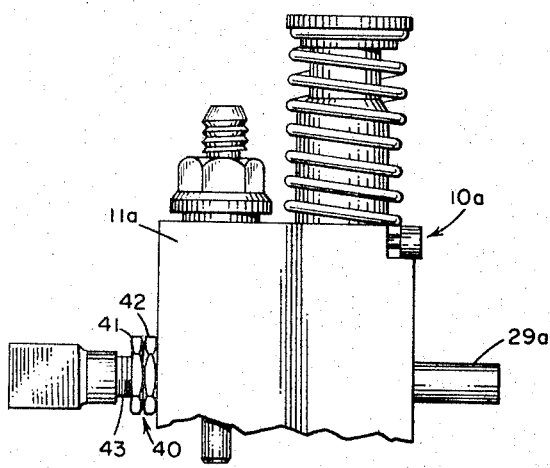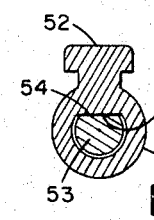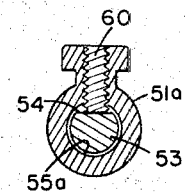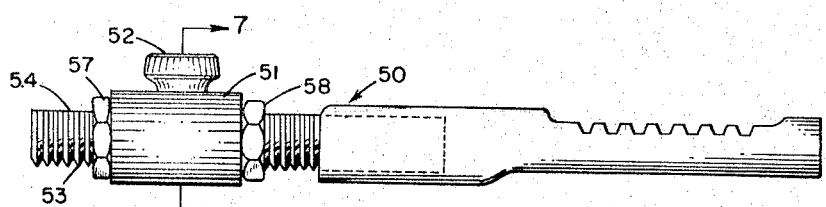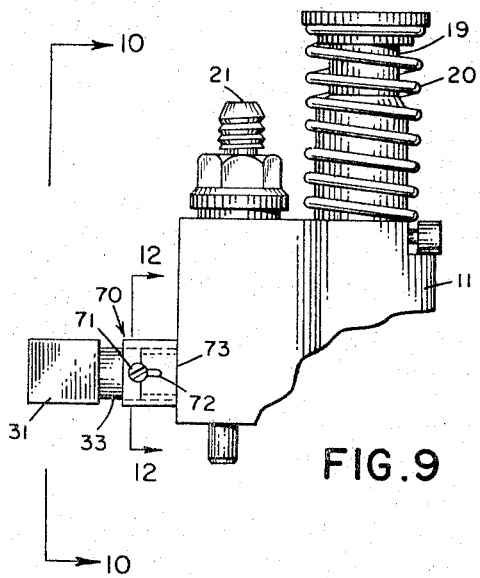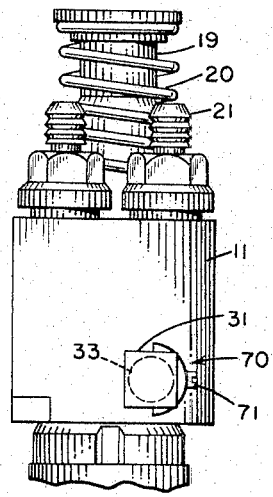

Aug. 22, 1967   A. J. BUESCHER ET AL   3,336,874
DETENT METERING DEVICE
Original Filed Oct. 20, 1964   4 Sheets-Sheet 3

INVENTORS
ALFRED J. BUESCHER
MAX KRECIC
BY
ATTORNEYS

INVENTORS
ALFRED J. BUESCHER
MAX KRECIC
ATTORNEYS

United States Patent Office 3,336,874
Patented Aug. 22, 1967

3,336,874
DETENT METERING DEVICE
Alfred J. Buescher, 3399 Seaton 44113, and Max Krecic, 120 E. 209th St. 44123, both of Cleveland, Ohio
Continuation of abandoned applications Ser. No. 405,060, Ser. No. 405,061, and Ser. No. 405,083, Oct. 20, 1964. This application May 16, 1966, Ser. No. 550,281
9 Claims. (Cl. 103—41)

This application is a continuing application with respect to applications Ser. Nos. 405,060, 405,061, and 405,083, all filed Oct. 20, 1964.

This invention relates to fuel injectors for effecting periodic injections of fuel to internal combustion engines, and particularly to fixed and movable detent metering devices for such fuel injectors.

Fuel injectors of the plunger type include a plunger which is provided with helical edges for successively closing a first port and then a second port to start an injection and for then opening the second port to terminate the injection. The volume of the injection may be varied by rotating the plunger about its longitudinal axis to thereby control the start and finish of the injection by changing the longitudinal relationship between the helical edges and the ports. The rotation of the plunger about its longitudinal axis is effected by a pinion gear which is splined to a portion of the plunger and which is rotated by a rack which extends through the plunger housing and meshes with the pinion gear.

The rack is connected to a linkage means or control arm, which in turn is connected to other injector racks to control the volume of injection into the cylinders of the engine. When a rack is pushed toward the injector housing, the plunger is rotated so that, upon stroking of the plunger, a relatively large volume of fuel is pumped into the cylinder. Similarly, when the rack is pulled outwardly from the injector housing, a relatively small volume of fuel is pumped into a cylinder when the plunger is stroked. Thus, the rack serves as a throttle to control the amount of fuel which is pumped into a cylinder at each stroke of the plunger.

It is customary for a diesel mechanic to adjust each injector rack individually so that each cylinder is provided with the same amount of fuel for each stroke of an injector plunger. If the engine involved is an industrial or marine type diesel engine, this adjustment is effected by adjusting each rack relative to its control linkage with the rack in a full throttle position or a position that is close to a full throttle position. If, on the other hand, the engine involved is a locomotive-type diesel engine, this adjustment is effected by adjusting each rack relative to its control linkage with the rack in either a high or low throttle position. The mechanic assumes that each rack is adjusted to deliver equal volumes of fuel to each cylinder when the engine runs smoothly. Thus, the mechanic adjusts the engine by ear and, although many mechanics are highly skilled in making such an adjustment, frequently one or more cylinders are not receiving the proper amount of fuel required for smooth, efficient and economical operation.

Fuel injectors have an absolute maximum fuel output and this output is established when the fuel injector rack is pushed toward the injector housing and the aforementioned helical edges are spaced so that an injector delivers the maximum output according to its design characteristics. The racks of such injectors, however, are seldom adjusted to this maximum fuel output position since this output varies from injector to injector and may waste fuel. The racks are therefore usually adjusted to positions between the absolute maximum fuel output position and a position that causes the injector to deliver slightly less than its absolute maximum output. For purposes of this application, therefore, the term "maximum" is intended to include an absolute maximum fuel output position and an adjusted or set rack position which is slightly less than this absolute maximum. Similarly, the term "minimum" is intended to include a range of fuel outputs which is slightly greater than zero output.

It is an object of this invention to provide a detent metering device which has a detent or stop mounted on the rack of the metering device, and which may be adjusted relative to the body to establish a stop for the rack or, in the case of a locomotive engine, which may be connected directly to the control arm for either high or low throttle adjustments so that each metering device of an engine may be initially adjusted to the same maximum or minimum fuel output for each plunger stroke and so that each metering device will, therefore, inject the same fuel volume as each other device for all rack positions that are determined by the linkage means.

It is a further object of this invention to provide a detent metering device which has a detent or stop mounted on the body of the metering device, and which may be adjusted relative to the body to establish a stop for the rack so that each metering device of an engine may be initially adjusted to the same maximum fuel output for each plunger stroke and so that each metering device will therefore inject the same fuel volume as each other device for all rack positions that are determined by the linkage means.

It is a further object of this invention to provide a movable detent metering device which has a detent or stop mounted on the rack of the metering device, and which may be adjusted relative to the rack to establish a stop for the rack which abuts the body of a metering device so that each metering device of the engine may be initially adjusted to the same maximum fuel output for each plunger stroke, and so that each metering device will therefore inject the same fuel volume as each other device for all rack positions that are determined by the linkage means.

It is a further object of this invention to provide such movable detents on a fuel injector which may be initially adjusted at the factory to provide similar fuel outputs for all the fuel injectors of a single engine, but which may be conveniently adjusted in use without removing the injector from its engine.

It is a still further object of this invention to provide a stop or detent on a fuel injector which not only establishes a maximum fuel output position for the rack, but which also includes means to securely retain the rack head on its rack body.

These and other objects of the invention will become apparent from the following detailed description and from the accompanying drawings.

FIGURE 5 is a fragmentary, elevational view of a detent metering device according to a further aspect of this invention.

FIGURE 6 is an elevational view of a rack according to a further aspect of this invention.

FIGURE 7 is a cross-sectional view of the rack shown in FIGURE 6, the plane of the section being indicated by the line 7—7 in FIGURE 6.

FIGURE 8 is a cross-sectional view similar to FIGURE 7 but showing a modified sleeve portion.

FIGURE 9 is a fragmentary, elevational view of a detent metering device according to a further aspect of this invention.

FIGURE 10 is another fragmentary, elevational view of the metering device shown in FIGURE 9, the plane of the view being indicated by the line 10—10 in FIGURE 9.

Figure 1:
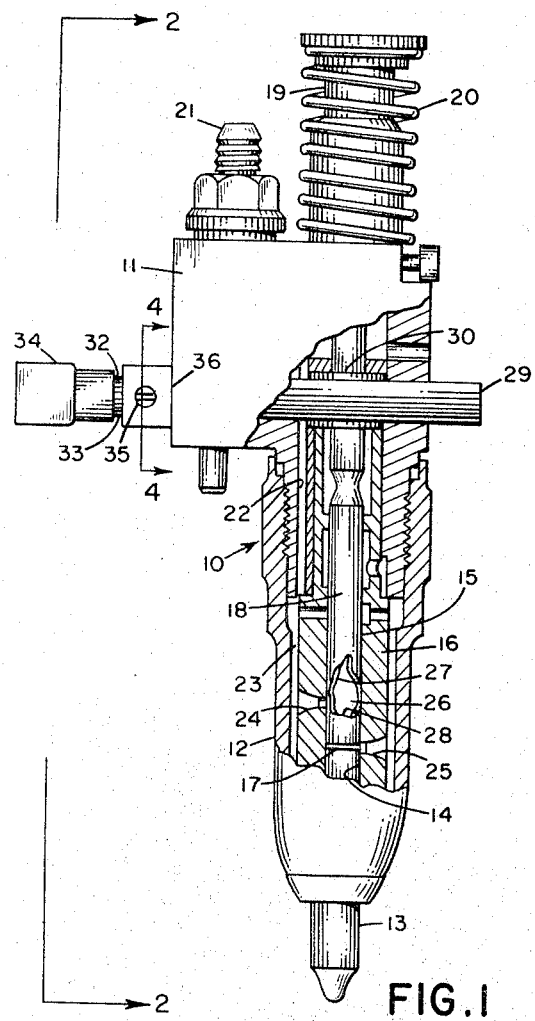
FIGURE 1 is an elevational view, partly in section of a detent metering device according to an aspect of this invention.
Figure 2:
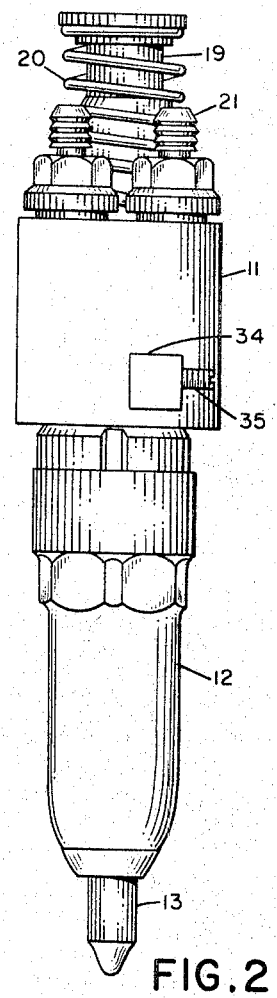
FIGURE 2 is another elevational view of the metering device shown in FIGURE 1, the plane of the view being indicated by the line 2—2 in FIGURE 1.
Figure 3:
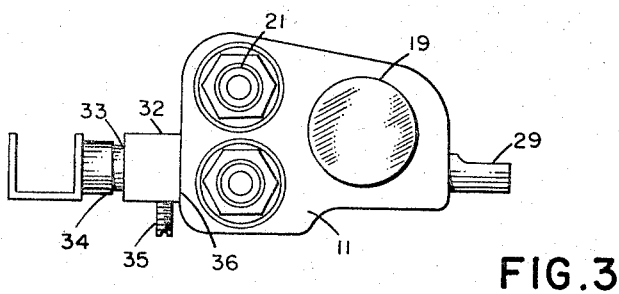
FIGURE 3 is a plan view of the metering device shown in FIGURES 1 and 2.
Figure 4:
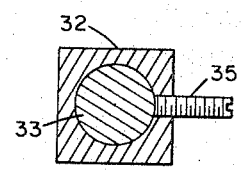
FIGURE 4 is an enlarged, cross-sectional view of the metering device, the plane of the section being indicated by the line 4—4 in FIGURE 1.
Figure 11:
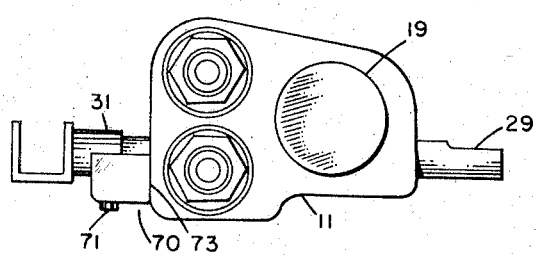
FIGURE 11 is a plan view of the metering device shown in FIGURES 9 and 10.
Figure 12:
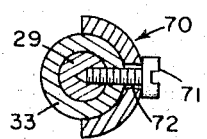
FIGURE 12 is an enlarged cross-sectional view of the metering device, the plane of the section being indicated by the line 12—12 in FIGURE 9.

Referring now to the drawings, and particularly to FIGURES 1 through 4, an injection or metering device 10 is illustrated. The metering device 10 includes an upper body portion 11 and a lower body portion 12 which is threaded to the portion 11, and which is intended to extend through an opening in the cylinder head of an internal combustion engine to position the portion 12 within a cylinder of the engine. The injection device 10 further includes a spray tip end 13 which is provided with small orifices (not shown) and a delivery valve (not shown) which delivers fuel to the orifices when a predetermined fuel pressure is reached in a pumping chamber 14.

The pumping chamber 14 is defined by an axial bore 15 in a sleeve 16 and a lower end 17 of a plunger 18. The plunger 18 is fixed at its upper end to a guide sleeve 19 which is slidably received in the upper portion 11. The guide sleeve 19 and the plunger 18 are biased inwardly by a compression spring 20. The sleeve 19 and the plunger 18 are reciprocated by a rocker arm (not shown), which is in turn actuated by the engine's crankshaft. Fuel is pumped from the chamber 14 periodically and is delivered to the engine cylinder periodically and in precisely metered amounts in a manner that will now be explained.

The fuel is supplied to the device 10 under a moderate pressure by a fuel pump (not shown). The fuel is delivered to an inlet port 21, through a passage 22 in the upper portion 11, and then to an annular fuel receiving chamber 23. The chamber 23 is in fluid communication with the bore 15 through a fuel inlet port 24 and a bypass port 25.

The lower end of the plunger 18 is provided with an annular groove 26, which is defined by upper and lower helical edges 27 and 28, respectively. A passageway (not shown) provides fluid communication between the pumping chamber 14 and the groove 26.

When the plunger is pushed downwardly by the rocker arm against the bias of the spring 20, the end 17 of the plunger 18 covers the port 25. The fluid in the pumping chamber 14 is not pressurized, since it is free to flow from the chamber 14 to the groove 26 through the passageway (not shown). When the edge 27 covers the port 24, however, the fluid in the pumping chamber 14 is pressurized and the pressurized fluid is sprayed from the nozzle tip 13 when a predetermined pressure is achieved. The pressure in the chamber 14 is relieved and the injection is complete when the port 25 is in communication with the bore 26 upon further movement of the plunger 18. The beginning and end of the injection, and therefore the volume of fuel that is injected, are dependent upon the distance that the end 17 travels during the period defined by the time when the edge 27 blocks the port 23 and the edge 28 opens the port 25. By rotating the plunger 18, the amount of fuel injected may be increased or decreased, since the helical edges 27 and 28 will start and end the period of injection at different times to thereby change the volume of fuel injected.

The plunger 18 is rotated by a rack 29, which engages a pinion gear 30 that is splined to the upper portion of the plunger 18. The rack 29 is provided at one end with a head 34 which is connected to a linkage means or control arm (not shown) that adjusts the position of each rack relative to its injector.

According to one aspect of the invention, a detent or stop member 32 is threaded onto a threaded body portion 33 of the rack 29. The detent 32 may be adjusted toward or away from a head portion 34 of the rack 29 by turning the detent. The detent 32 may be locked relative to the threaded body portion 33 by tightening a setscrew 35. When the screw 35 is tightened and the detent is locked relative to the threaded body portion 33, an end portion 36 of the detent limits the inward travel of the rack 29 with respect to the body 11.

The detent 32 is adjusted so that its end portion 36 limits the inward travel of the rack 29 at a position where the plunger 18 pumps a set amount of fuel from the injector during each stroke. Each other injection device which is to be provided on an engine is similarly adjusted so that each injection device will pump a uniform, set amount of fuel from its pumping chamber when each detent abuts the body of its injector. When each rack is connected to the linkage means, movement of that linkage will correspondingly decrease and increase the fuel output of each injector, and this fuel output will be uniform for all rack positions.

Referring now to FIGURE 5, a movable detent metering device 10a, according to a further aspect of this invention, is illustrated. The device 10a includes a detent 40 which comprises a pair of locked nuts 41 and 42, which are threaded onto a threaded body portion 43 of a rack 29a. The lock nut 42 may be adjusted to any desired position and locked in place by the nut 41 so that it butts against a body portion 11a of the metering device 10a to establish a maximum fuel output position for the metering device 10a.

Figure 20:
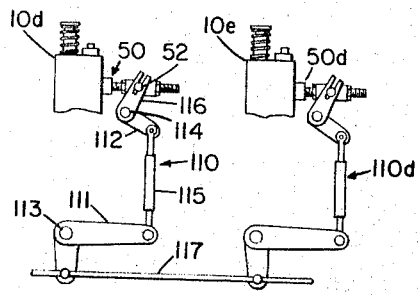
FIGURE 20 is a fragmentary elevational view of a linkage control system which may be employed in combination with the rack illustrated in FIGURE 6.

Referring now to FIGURES 6, 7, and 20 a rack 50 is illustrated. The rack 50 is intended to be employed on a fuel injector 10d (FIG. 20) for a railroad-type diesel engine. As was previously stated, the racks of such injectors are adjusted with the rack in a high or low throttle position. According to the aspect of the invention illustrated in FIGURES 6, 7, and 20 this adjustment is effected by a sleeve 51 which serves as a lost length adjustment for the rack 50. The sleeve 51 is connected to a conventional rack linkage 110 (FIG. 20) by a button 52 and is slidably mounted on a threaded end portion 53 of the rack 50. The sleeve 51 and the portion 53 are splined against relative rotation by a flattened portion 54 of the end portion 53, which cooperates with a flattened inner portion 55 of the sleeve 51. Longitudinal movement between the sleeve 51 and the portion 53 is permitted since the inner surface of the sleeve 51 is slightly larger than the outer periphery of the portion 53.

The convention rack linkage 110 includes first and second bell crank arms 111 and 112 which are respectively pivoted at fixed pivot points 113 and 114. The arms 111 and 112 are tied together by a rod 115. The arm 112 is provided with a forked end portion 116, the tines of which extend under the button 52. The rack 50 may be moved inwardly with respect to the fuel injector device 10d by moving a control rod 117 axially to the right as viewed in FIGURE 20 to rotate the bell crank arms 111 and 112 in a counterclockwise direction as viewed in that figure. The rack 50 may be moved outwardly with respect to the device 10d by moving the control rod axially to the left as viewed in FIGURE 20 to rotate the bell crank arms 111 and 112 in a clockwise direction as viewed in that figure.

Movement of the control rod 117 to the left as viewed in FIGURE 20 is limited by the linkage itself in that maximum movement obtains when the pivotal connection between the rod 115 and the bell crank arm 112 substantially reaches a dead center position with respect to the fixed pivot point 114.

An identical rack linkage 110d connects the control rod 117 to a rack 50d of an associated fuel injection device 10e.

With the control rod 117 moved to its limiting position to the left, and with the bell crank arm 112 in its aforementioned dead center position, the threaded portion 53 is moved longitudinally with respect to the sleeve 51 to establish a predetermined minimum fuel output from the injector. When this position has been established, nuts 57 and 58 are tightened against the ends of the sleeve 51 to lock the sleeve in place. Each other injection device 10e which is to be provided on an engine is similarly adjusted so that each injection device will pump a uniform, minimum amount of fuel from its pumping chamber. When each rack is adjusted in this manner and connected to the linkage means, movement of that linkage will correspondingly increase and decrease the fuel output of each injector and fuel output will be uniform for all rack positions.

It should be appreciated that other means may be provided which prevent relative rotation between the sleeve 51 and the portion 53. As is shown in FIGURE 8, a sleeve 51a may have a cylindrical bore 55a. A pin 60 is threaded into the bore and prevents rotation of the sleeve 51a relative to the end portion 53 when the pin engages the portion 54.

Referring now to FIGURES 9 through 12, a detent or stop member 70 is fixed to the head portion 31 of the rack 29 by a screw 71. As may be seen most clearly in FIGURES 9 and 12, the screw 71 extends through a longitudinal slot 72 in the detent 70 and is threaded through the portion 31 and into the rack 29. By loosening the screw 71, the detent 70 may be adjusted toward or away from the body portion 11. The screw 71 may then be tightened to lock the detent so that an end portion 73 limits the inward travel of the rack 29 with respect to the body 11.

The detent 70 is adjusted so that its end portion 73 limits the inward travel of the rack 29 at a position where the plunger 18 pumps a set amount of fuel from the injector during each stroke. Each other injection device which is to be provided on an engine is similarly adjusted so that each injection device will pump a uniform, set amount of fuel from its pumping chamber when each detent abuts the body of its ejector. When each rack is connected to the linkage means, movement of that linkage will correspondingly decrease and increase the fuel output of each injector and this fuel output will be uniform for all rack positions.

As was previously stated, the screw 71 extends through the head portion 31 and into the rack 29. This is a particularly appealing feature of the invention in that the screw 71 also serves as a means to retain the head portion 31 on its rack 29. Normally, a head portion is simply press-fitted onto its rack. This construction, however, is not wholly acceptable in many applications in that the heads tend to separate from the racks as a result of engine vibration, rough handling, and/or faulty construction.

Figure 13:
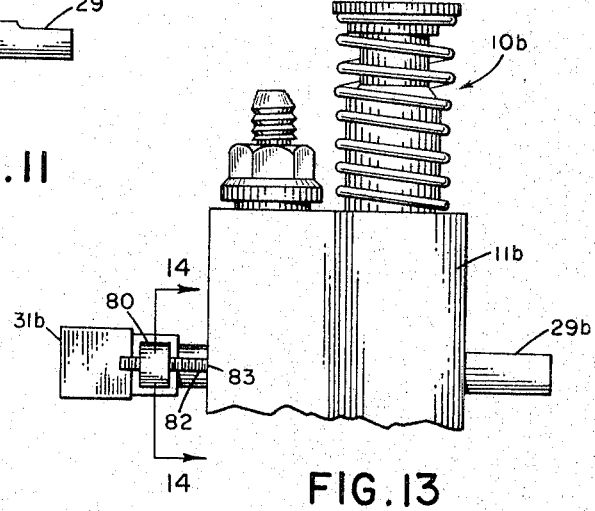
FIGURE 13 is a fragmentary, elevational view of a detent metering device according to a further aspect of this invention.
Figure 14:
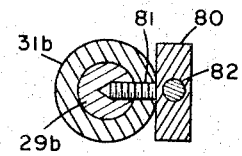
FIGURE 14 is a cross-sectional view of the metering device, the plane of the section being indicated by the line 14—14 in FIGURE 13.

Referring now to FIGURES 13 and 14, a detent metering device 10b, according to a further aspect of this invention, is illustrated. The device 10b includes a detent 80 having a pin 81 threaded through a head portion 31b of a rack 29b and into the rack 29b. The detent 80 further includes an adjustable checking pin 82 which is threaded through the detent 80 and which may be adjusted toward or away from a body portion 11b of the device 10b by being screwed into or out of the detent 80. An end 83 of the pin 82 butts against the body portion 11b to establish a maximum fuel output position for the metering device 10b.

It should be noted that the pin 81 not only serves to fix the detent 80 to the rack 29b but also serves to fix the head 31b onto the rack 29b.

Figure 15:
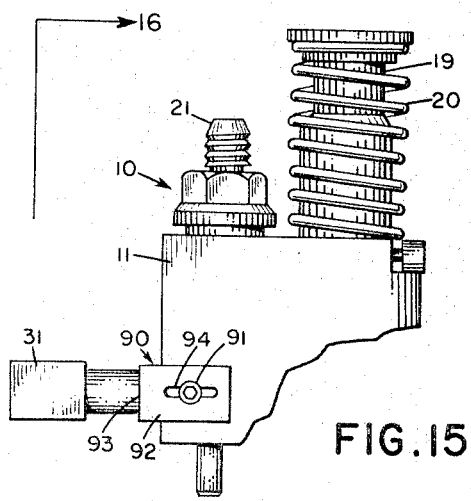
FIGURE 15 is a fragmentary, elevational view of a detent metering device according to a further aspect of this invention.
Figure 16:
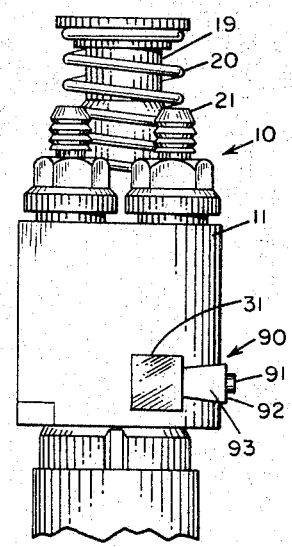
FIGURE 16 is another fragmentary, elevational view of the metering device shown in FIGURE 15, the plane of the view being indicated by the line 16—16 in FIGURE 15.
Figure 17:
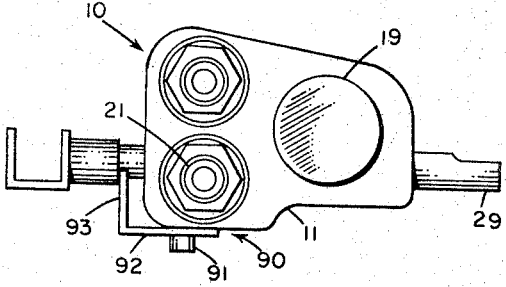
FIGURE 17 is a plan view of the metering device shown in FIGURES 15 and 16.

Referring now to FIGURES 15, 16, and 17, a detent or stop member 90 is fixed to the upper portion 11 of the device 10 by a cap screw 91. The detent 90 comprises a body engaging portion 92 and a checking portion 93 which is substantially perpendicular to the portion 92. The body engaging portion 92 is provided with an elongated slot 94 so that the checking portion 93 may be adjusted toward or away from the portion 11.

The detent 90 is adjusted so that its checking portion 93 limits the inward travel of the rack 29 at a position where the plunger 18 pumps a set amount of fuel from the injector during each stroke. Each other injection device which is to be provided on an engine is similarly adjusted so that each injection device will pump a uniform, set amount of fuel from its pumping chamber when each head 31 abuts the checking portion 93 of its detent 90. When each rack is connected to the linkage means, movement of that linkage will correspondingly decrease and increase the fuel output of each injector and this fuel output will be uniform for all rack positions.

Figure 18:
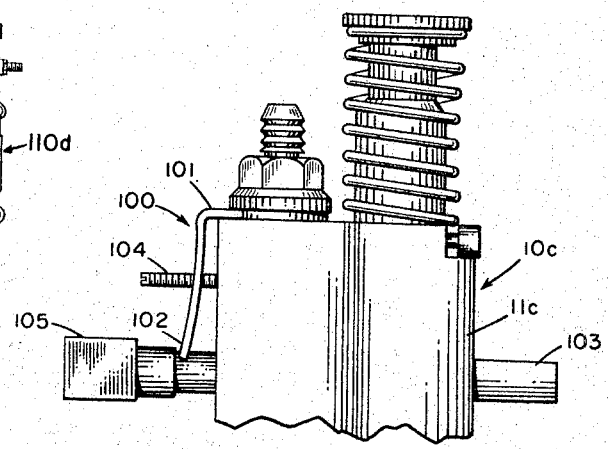
FIGURE 18 is a fragmentary, elevational view of a detent metering device according to a further aspect of this invention.
Figure 19:
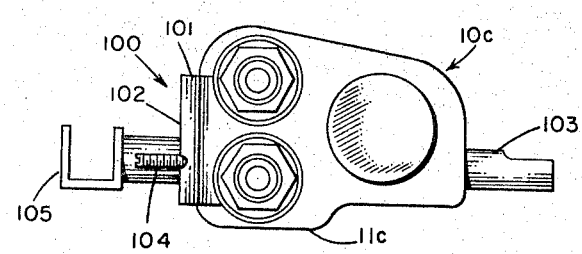
FIGURE 19 is a plan view of the metering device shown in FIGURE 18.

Referring now to FIGURES 18 and 19, a detent metering device 10c, according to a further aspect of this invention, is illustrated. The device 10c includes a detent 100 which has a portion 101 that is riveted to the top of an upper body portion 11c of the device 10c. The detent 100 also includes a checking portion 102 which limits the inward movement of a rack 103.

The detent 100 is fabricated from spring steel and the portion 102 is normally biased inwardly toward the body 11c of the device 10c, but is held outwardly by a screw 104 which is threaded through the portion 102 and which butts against the body 11c. The lower end of the portion 102 serves as a stop for a head portion 105 of the rack 103, and this end may be adjusted outwardly relative to the body 11c by threading the screw into the portion 102 and may be adjusted inwardly relative to the body 11c by threading the screw out of the portion 102.

It should be appreciated that the portion 101 may be fixed to the side of the body 11c rather than the top, depending upon the space requirements for each injector.

The invention is not restricted to the slavish imitation of each and every one of the details and features described above, which have been set forth merely by way of example, with the intent of most fully setting forth the teaching of the invention. Obviously, devices may be

What is claimed is:

1. In a metering device having a body portion, a plunger reciprocable in said body portion and adapted to eject a measured amount of fuel from a nozzle at one end of the device, and means to vary the fuel output of the device, said means comprising a pinion splined to said plunger and a rack cooperating with the pinion and movable between a maximum fuel output position wherein a head portion of the rack is in proximity to the body portion of the device and a minimum fuel output position wherein the head portion of the rack is spaced away from said body portion, in combination therewith the improvement which comprises a detent fixed to said rack and having a portion for blocking the inward movement of said rack relative to said body portion, means fixing said detent to the head portion of said rack and fixing said head portion to its rack, and means to adjust the position of said blocking portion relative to said rack so that the inward movement of said rack is limited at a maximum fuel output position.

2. In a metering device having a body portion, a plunger reciprocable in said body portion and adapted to eject a measured amount of fuel from a nozzle at one end of the device, and means to vary the fuel output of the device, said means comprising a pinion splined to said plunger and a rack cooperating with the pinion and movable between a maximum fuel output position wherein a head portion of the rack is in proximity to the body portion of the device and a minimum fuel output position wherein the head portion of the rack is spaced away from said body portion, in combination therewith the improvement which comprises a detent fixed to said rack and having a portion for blocking the inward movement of said rack, said detent having a longitudinal slot therein, means extending through said slot and said head portion and into said rack for locking said detent against said head portion when said detent is in a selected blocking position and for fixing said head portion onto said rack.

3. In a metering device having a body portion, a plunger reciprocable in said body portion and adapted to eject a measured amount of fuel from a nozzle at one end of the device, and means to vary the fuel output of the device, said means comprising a pinion splined to said plunger and a rack cooperating with the pinion and movable between a maximum fuel output position wherein a head portion of the rack is in proximity to the body portion of the device and a minimum fuel output position wherein the head portion of the rack is spaced away from said body portion, in combination therewith the improvement which comprises a detent fixed to said rack and blocking the inward movement of said rack, said detent having a pin extending through said head portion and into said rack and having a second pin threaded through a portion of said detent and extending toward said body and butting against said body for adjustably limiting the inward movement of the rack at its maximum fuel output position.

4. In a metering device having a body portion, a plunger reciprocable in said body portion and adapted to eject a measured amount of fuel from a nozzle at one end of the device, and means to vary the fuel output of the device, said means comprising a pinion splined to said plunger and a rack cooperating with the pinion and movable between a first position wherein a head portion of the rack contacts the body portion of the device and a second position wherein the head portion of the rack is spaced away from said body portion, in combination therewith the improvement which comprises a detent fixed to said body portion and blocking the inward movement of said rack at a third position between said first and second positions and means to adjust the position of said detent relative to said body so that the inward movement of said rack is limited at said third position.

5. In a metering device having a body portion, a plunger reciprocable in said body portion and adapted to eject a measured amount of fuel from a nozzle at one end of the device, and means to vary the fuel output of the device, said means comprising a pinion splined to said plunger and a rack cooperating with the pinion and movable between a first position wherein a head portion of the rack contacts the body portion of the device and a second position wherein the head portion of the rack is spaced away from said body portion, the improvement comprising a detent fixed to said body portion and blocking the inward movement of said rack at a third position between said first and second positions, said detent having a first portion fixed to said body portion and a second portion extending from said first portion and butting against a portion of said rack to limit the inward movement of said rack at said third position.

6. The improvement according to claim 5, including means to adjust the position of said second portion relative to said body at said third position.

7. In a metering device having a body portion, a plunger reciprocable in said body portion and adapted to eject a measured amount of fuel from a nozzle at one end of the device, and means to vary the fuel output of the device, said means comprising a pinion splined to said plunger and a rack cooperating with the pinion and movable between a maximum fuel output position wherein a head portion of the rack is in proximity to the body portion of the device and a minimum fuel output position wherein the head portion of the rack is spaced away from said body portion, the improvement comprising a detent fixed to said body portion and blocking the inward movement of said rack, said detent having a first portion fixed to said body portion and a second portion extending from said first portion for blocking the inward movement of said rack at a maximum fuel output position, said first portion having a longitudinal slot therein, means extending through said slot and into said body portion for locking said first portion against said body portion when said second portion is in a selected blocking position.

8. In a metering device having a body portion, a plunger reciprocable in said body portion and adapted to eject a measured amount of fuel from a nozzle at one end of the device, and means to vary the fuel output of the device, said means comprising a pinion splined to said plunger and a rack cooperating with the pinion and movable between a maximum fuel output position wherein a head portion of the rack is in proximity to the body portion of the device and a minimum fuel output position wherein the head portion of the rack is spaced away from said body portion, the improvement comprising a detent fixed to said body portion and blocking the inward movement of said rack, said detent comprising a first portion fixed to said body portion and a second portion extending from said first portion for blocking the inward movement of the rack at a maximum fuel output position, said second portion being normally biased inwardly toward said body portion, and means on said second portion and butting against said body for adjustably retaining said second portion at a position limiting the inward movement of the rack at its maximum fuel output position.

9. In a metering device having a body portion, a plunger reciprocable in said body portion and adapted to eject a measured amount of fuel from a nozzle at one end of the device, and means to vary the fuel output of the device, said means comprising a pinion splined to said plunger and a rack cooperating with the pinion and movable between a maximum fuel output position wherein a head portion of the rack is in proximity to the body portion of the injector and a minimum fuel output position wherein the head portion of the rack is spaced away from the body portion, in combination therewith the improvement which comprises a sleeve longitudinally slidable on one end of said rack, means on said sleeve for connecting the sleeve to a rack linkage, means to lock the rack relative to said sleeve so that the outward movement of said rack is limited at a maximum or minimum fuel output position.

References Cited

UNITED STATES PATENTS

| | | | |
|---|---|---|---|
| 413,641 | 10/1889 | Babbitt et al. | 287—52.08 |
| 752,156 | 2/1904 | Hacker | 287—52.07 |
| 879,384 | 2/1908 | Hillman | 74—522 |
| 1,845,600 | 2/1932 | Herr | 103—41 |
| 1,967,101 | 7/1934 | Rassbach et al. | 103—41 |
| 2,127,211 | 8/1938 | Edwards | 103—41 |
| 2,222,593 | 11/1940 | Hurst et al. | 103—41 |
| 2,258,655 | 10/1941 | Links | 103—41 |
| 2,297,234 | 9/1942 | Meiswinkel | 123—139 |
| 2,484,551 | 10/1949 | Brouse | 74—522 |
| 2,534,553 | 12/1950 | Hogeman | 103—41 |
| 2,703,516 | 3/1955 | Kluge et al. | 74—522 |
| 2,877,711 | 3/1959 | Evans | 103—41 |
| 3,103,829 | 9/1963 | Basford | 60—39.28 |

ROBERT M. WALKER, *Primary Examiner.*

MARK NEWMAN, *Examiner.*

W. J. KRAUSS, *Assistant Examiner.*